Patented Oct. 13, 1936

2,057,330

UNITED STATES PATENT OFFICE 2,057,330

PROCESS OF PRODUCING ARTIFICIAL STONE

Ernst Heinrich Eichert, Weinsberg, Germany, assignor of one-half to Martin Weger, Schweinfurt-on-the-Main, Germany No Drawing. Application November 10, 1934, Serial No. 752,535. In Germany April 6, 1934

6 Claims. (Cl. 106—24)

This invention relates to a process of producing artificial stone masses for floor and wall coverings and the like.

A material possessing all the properties of xylolite and made hitherto from magnesium oxide, magnesium chloride and sawdust or cork can be produced, according to the invention, by mixing a hydraulic binder like Portland cement with a mass consisting of sodium sulfate, calcium chloride, calcium carbonate, in certain proportions, and sawdust, cork or similar organic substances.

Production is effected by mixing 7 kg. to 8 kg. sodium sulfate with 125 g. to 150 g. calcium chloride, adding 92 kg. to 93 kg. calcium carbonate and immediately subjecting the mixture to fine grinding before the calcium chloride volatizes in the air. This mixture can be kept for months and used as addition agent.

The material is compounded by providing a dry mixture of 10 parts by volume sawdust or cork or other organic fillers like animal hair, peat, etc., 5 parts fine stone powder and 1 part of the mixture described in the preceding paragraph, then pouring 4 to 5 parts cement thereover, mixing the ingredients thoroughly again while dry and thereupon with water so as to prepare a well moistened but not a wet mixture which is then worked like xylolite. This mass can be jointlessly applied to concrete and wooden floors, can be nailed and sawed, is as a walkable floor warmer than xylilite or concrete made from cement and sand, and has a sound deadening effect. The material can further be used for producing plastic masses which can be turned or drilled.

I claim:—

1. Process of producing artificial stone masses, comprising combining an organic filler with stone powder and a mass consisting of calcium chloride, sodium sulphate and calcium carbonate; mixing the mass thus obtained with a hydraulic binder; and applying this mixture to form the desired masses.

2. A process according to claim 1, in which the organic filler is saw-dust and the hydraulic binder is Portland cement.

3. A process according to claim 1, in which the organic filler is cork and the hydraulic binder is Portland cement.

4. A process according to claim 1, in which the organic filler is peat and the hydraulic binder is Portland cement.

5. A process according to claim 1, in which the last-mentioned mixture is composed of the following parts by volume; 10 parts organic filler, 5 parts stone powder, 1 part of the mass consisting of calcium chloride, sodium sulphate and calcium carbonate, and 4 to 5 parts hydraulic binder.

6. A process according to claim 1, in which the mass containing the three compounds is in the following amounts; 7 to 8 kg. sodium sulphate, 125 to 150 g. calcium chloride, and 92 to 93 kg. calcium carbonate.

ERNST HEINRICH EICHERT.